(12) United States Patent
Kang

(10) Patent No.: US 9,852,089 B2
(45) Date of Patent: Dec. 26, 2017

(54) SEMICONDUCTOR DEVICE

(71) Applicant: SK hynix Inc., Icheon-si, Gyeonggi-do (KR)

(72) Inventor: Hyuk Choong Kang, Seongnam-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 139 days.

(21) Appl. No.: 14/977,813

(22) Filed: Dec. 22, 2015

(65) Prior Publication Data

US 2017/0031848 A1 Feb. 2, 2017

(30) Foreign Application Priority Data

Jul. 30, 2015 (KR) .................. 10-2015-0108192

(51) Int. Cl.
*G06F 13/16* (2006.01)
*G06F 13/40* (2006.01)

(52) U.S. Cl.
CPC ...... *G06F 13/1694* (2013.01); *G06F 13/4068* (2013.01)

(58) Field of Classification Search
CPC .................................................. G06F 13/1694
See application file for complete search history.

(56) References Cited

U.S. PATENT DOCUMENTS

| 8,225,006 | B1* | 7/2012 | Karamcheti | G06F 11/20 710/5 |
| 8,904,082 | B1* | 12/2014 | Brahmadathan | G06F 13/1647 710/18 |
| 2006/0151614 | A1 | 7/2006 | Nishizawa et al. | |
| 2008/0082766 | A1* | 4/2008 | Okin | G06F 13/1684 711/154 |
| 2011/0227234 | A1 | 9/2011 | Nishizawa et al. | |

FOREIGN PATENT DOCUMENTS

WO 2005004047 A1 1/2005

* cited by examiner

*Primary Examiner* — Farley Abad
(74) *Attorney, Agent, or Firm* — William Park & Associates Ltd.

(57) ABSTRACT

A semiconductor device includes a memory device, a host, and an interface. The memory device includes various types of memory units configured to be mounted to one slot. The host stores memory characteristic information of the various types of memory units contained in the memory device, processes a signal for the memory units on the basis of the memory characteristic information, and transmits and receives the processed signal to and from the memory units. The interface allows the host to interface with the various types of memory units contained in the memory device.

9 Claims, 3 Drawing Sheets

SEMICONDUCTOR DEVICE

CROSS-REFERENCE TO RELATED APPLICATION

This application claims priority based upon Korean patent application No. 10-2015-0108192, filed on Jul. 30, 2015, the disclosure of which is incorporated herein by reference in its entirety.

BACKGROUND OF THE INVENTION

Embodiments of the present disclosure relate to a semiconductor device.

There are various kinds of semiconductor memories, and each has its merits and demerits. For example, although it has a high integration density and provides high-speed access, a volatile memory such as DRAM is unable to retain data stored therein when it is powered off. In contrast, such a non-volatile memory as a NOR flash memory, which has a low integration density, can retain data stored therein even when it is powered off.

As semiconductor devices are applied to various kinds of electronic devices, it becomes more and more important for semiconductor memory makers to integrate various kinds of semiconductor memories into a single semiconductor device that keeps the merits of various kinds of semiconductor memories. However, it is difficult for various semiconductor memories operating in different ways to be integrated into a single semiconductor device. Therefore, when different semiconductor memories are integrated into a single semiconductor device, it is important to adjust factors that may vary depending on the respective operational characteristics of the semiconductor memories so that they are consistent with the respective interfaces of the semiconductor memories.

BRIEF SUMMARY OF THE INVENTION

An embodiment of the present disclosure relates to a semiconductor device for allowing various kinds of semiconductor memories to operate through one control unit.

An embodiment of the present disclosure relates to a semiconductor device in which various kinds of semiconductor memories are installable in one slot and coupled to each other through a relay to achieve a high integration density.

In accordance with an embodiment, a semiconductor device includes a memory device including various types of memory units, configured to be installed in one slot, a host configured to store memory characteristic information of the various types of memory units contained in the memory device, process a signal for the memory units on the basis of the memory characteristic information, and transmit and receive the processed signal to and from the memory units, and an interface configured to perform interfacing between the host and the various types of memory units contained in the memory device.

BRIEF DESCRIPTION OF THE DRAWINGS

The above and other features and advantages of the present disclosure will become readily apparent by reference to the following detailed description when considered in conjunction with the accompanying drawings.

DESCRIPTION OF EMBODIMENTS

Reference will now be made in detail to embodiments of the present disclosure, examples of which are illustrated in the accompanying drawings. Wherever possible, the same reference numbers will be used throughout the drawings to refer to the same or like parts.

In association with the embodiments of the present disclosure, specific structural and functional descriptions are disclosed only for illustrative purposes, the embodiments of the present disclosure can be implemented in various ways without departing from the scope or spirit of the present disclosure.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure.

The terms used in the present application are merely used to describe specific embodiments and are not intended to limit the present disclosure. A singular expression may include a plural expression unless otherwise stated in the context.

Unless otherwise defined, all terms used herein, including technical or scientific terms, have the same meanings as understood by those skilled in the art. Terms defined in a generally used dictionary may be analyzed to have the same meaning as the context of the relevant art and may not be analyzed to have ideal meaning or excessively formal meaning unless clearly defined in the present application. The terminology used in the present disclosure is for the purpose of describing particular embodiments only and is not intended to limit the disclosure.

Figure 1:
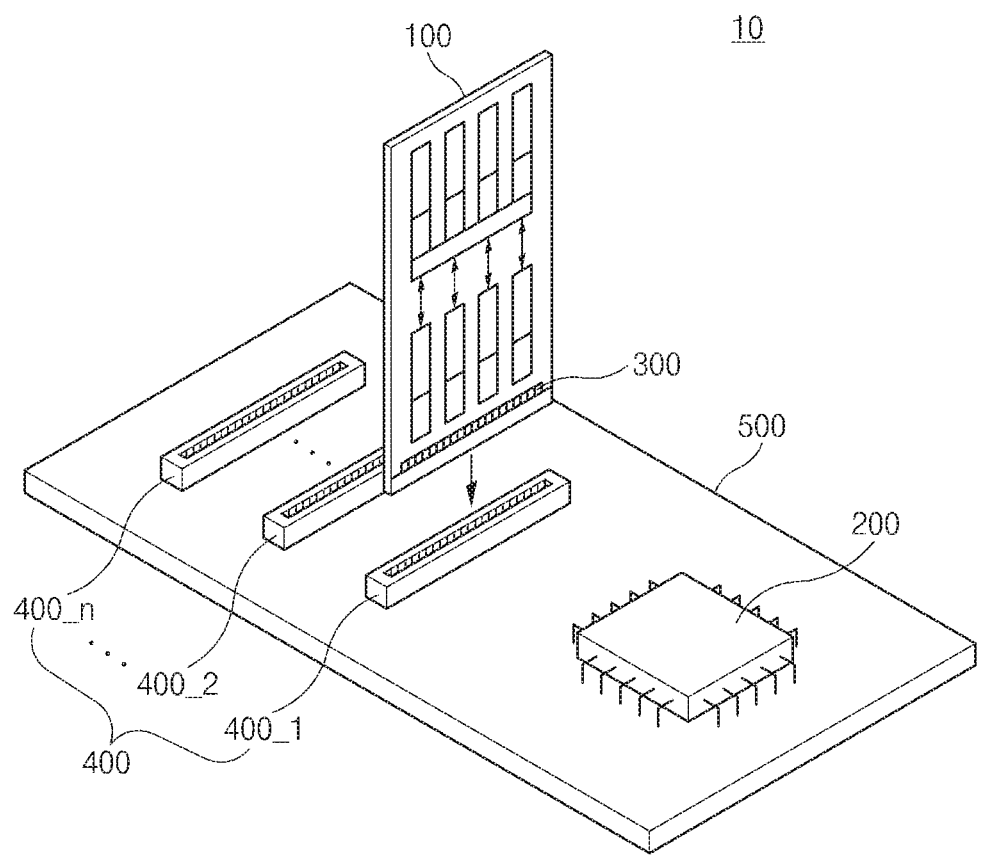
FIG. 1 is a schematic diagram illustrating an example of a semiconductor device according to an embodiment of the present disclosure.

FIG. 1 is a schematic diagram illustrating an example of a semiconductor device according to an embodiment of the present disclosure.

Referring to FIG. 1, the semiconductor device 10 according to an embodiment may include a memory device 100, a host 200, an interface 300, a slot unit 400, and a substrate 500.

The memory device 100 may include various types of memory units. Memory units contained in the memory device 100 may have different operation characteristics and different form factors. For example, the memory device 100 may include volatile memory units and/or non-volatile memory units. The volatile memory units may be classified into a static RAM (SRAM), a dynamic RAM (DRAM), a synchronous DRAM (SDRAM), etc. The non-volatile memory devices may be classified into a read only memory (ROM), a programmable read-only memory (PROM), an erasable erase and programmable ROM (EEPROM), an electrically erasable and programmable ROM (EPROM), a flash memory, a phase change RAM (PRAM), a magnetic RAM (MRAM), a resistive RAM (RRAM), a ferroelectric RAM (FRAM), etc. In addition, the memory device 100 may also include a Spin-Torque Transfer Magnetic Random Access Memory (STTMRAM), a Phase Change RAM (PCRAM), a Resistive RAM (ReRAM), etc.

The host 200 may transmit not only a command (e.g., request or command signal) but also an address and data to the memory device 100, and may receive data from the memory device 100. In accordance with an embodiment, the host 200 may include at least one of a Central Processing Unit (CPU), a Graphic Processing Unit (GPU), a multimedia processor (MMP), a digital signal processor (DSP), etc.

The host 200 may store information as to memory characteristics of various memory units contained in the memory unit 100. For example, the host 200 may store information as to positions (e.g., physical and logical positions), types, and capacities of the memory units. The host 200 may process a command, an address, and data on the basis of the memory characteristics such as the position, type, and capacity of a specific memory unit so that the command, address, and data become appropriate for a memory unit attempting to execute the command, and then provide the processed command, address, and data. In addition, when receiving data from a certain memory unit, the host 200 may interpret the data on the basis of the memory characteristic information.

In accordance with an embodiment, the host 200 may provide the command, address, and data on the basis of AC parameters appropriate for each memory unit. In addition, the host 200 may adjust data size capable of being transmitted at a time and a transfer rate according to characteristics of the memory unit, and perform address mapping or protocol conversion according to characteristics of the memory unit.

In accordance with an embodiment, the host 200 may periodically refresh volatile memories contained in the memory unit, and transmit data stored in the volatile memory units to the non-volatile memory unit when the power supply is cut off.

In accordance with an embodiment, the host 200 may directly receive information as to unique characteristics (e.g., the position, type, and capacity of each memory unit) of each memory unit contained in the memory device 100 from outside the host 200, or acquire such information from the memory unit 100 in an initial state. Therefore, the semiconductor device 10 according to an embodiment may flexibly operate even when the position of each memory unit contained in the memory device 100 is changed.

In accordance with an embodiment, information as to types or categories of the memory units may be contained in the information communicated between the host 200 and the memory device 100. Therefore, when the host 200 provides signals to the memory device 100, the signals may be transmitted through the interface 300, which provides interfaces appropriate for the memory units. In addition, the host 200 may recognize which memory unit is associated with the signal received from the memory device 100 and interpret the signal depending on types or categories of the memory units.

The interface 300 according to an embodiment may allow the host 200 to interface with the memory device 100. The interface 300 may include components such as a physical layer (PHY) and a Phase Locked Loop (PLL) circuit to provide an appropriate interface.

The interface 300 may convert signals such as data, command, and address signals into signals that are appropriate for each memory unit according to characteristics of the memory unit. The interface 300 according to an embodiment may serve as a unified interface providing an interface appropriate for various types of memory units.

In accordance with an embodiment, specific information indicating which one of interfacing operations will be executed by the interface 300 may be based on the signal received from the host 200 or memory type information contained in the signal received from the memory unit 100.

The interface 300 may compress or decode the address, command, and data received from the host 200 according to the interface of a destination memory unit so as to optimize the address, command, and data for the destination memory unit and convert them into a physical signal accordingly. The interface 300 may digitize and encode the physical signal, and then provide the encoded signal to the memory device 100.

For example, the interface 300 may communicate with the host 200 through one of several interface protocols, for example, a Serial Advanced Technology Attachment (SATA) protocol, a Peripheral Component Interconnect Express (PCIe), a Universal Serial Bus (USB) protocol, other connectors, and other interfaces.

For example, the interface 300 may include at least one bus (e.g., an address bus and/or a data bus) having a bus structure associated with an Open NAND Flash Interface (ONFI), a compact flash interface, a multimedia card (MMC), a Secure Digital (SD), CE-ATA, an Industrial Standard Architecture (ISA), a Micro-Channel Architecture (MSA), an Extended ISA (EISA), an Intelligent Drive Electronics (IDE), a VESA Local Bus (VLB), a Peripheral Component Interconnect (PCI), a card bus, a Universal Serial Bus (USB), an Advanced Graphics Port (AGP), a Personal Computer Memory Card International Association (PCMCIA) bus, an IEEE 1394 serving as a firewall, and a Small Computer Systems Interface (SCSI). As a result, the interface 300 may communicate with various types of memory units contained in the memory unit 100.

Therefore, the interface 300 may be an appropriate interface for various types of memory units contained in the memory device 100.

In accordance with an embodiment, the interface 300 may serve as a memory controller. The interface 300 may perform address remapping, and may share memory characteristic information with the host 200 to manage the memory characteristic information.

In accordance with an embodiment, the memory device 100 may be implemented as a card acting as a single physical object together with the interface 300, and may be installed in a plurality of slots (400_1, 400_2, . . . , and 400_n) contained in the substrate 500.

The memory device 100 may be installed in individual slots (400_1, 400_2, . . . , and 400_n) one by one, and the memory device 100 mounted in the slot may communicate with the host 200 through a conductive line printed on the substrate 500.

As described above, the memory device 100 receives data converted to be appropriate for various types of memory units through the host 200 and the interface 300, and thus, no matter what type of memory unit the memory device 100 has, all the memory units can communicate with the host 200.

By integrating various kinds of memory units into the memory device 100 while interconnecting them through a relay, the memory device 100 installed in one slot can achieve a high integration density.

Figure 2:
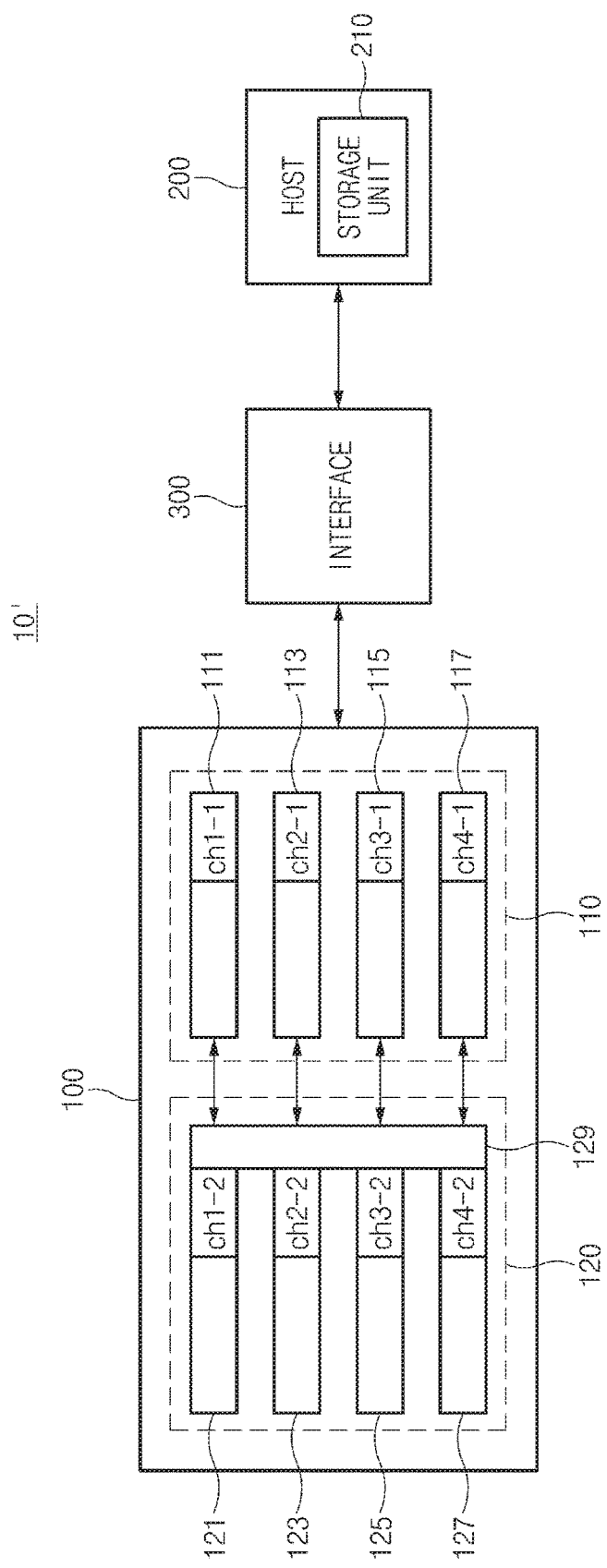
FIG. 2 is a block diagram illustrating an example of a semiconductor device according to an embodiment of the present disclosure.

FIG. 2 is a block diagram illustrating a semiconductor device according to an embodiment of the present disclosure.

Referring to FIG. 2, the semiconductor device 10' may include a memory device 100, a host 200, and an interface 300.

The memory device 100 may include a master memory unit block 110 and a slave memory unit block 120. A plurality of master memory units 111, 113, 115, and 117 contained in the master memory unit block 110 may be coupled to a plurality of slave memory units 121, 123, 125, and 127 through a relay 129 contained in the slave memory unit block 120.

In accordance with an embodiment, the memory device 100 may communicate with the host 200 through the interface 300 by using a plurality of channels ch1, ch2, ch3, and ch4. One channel may communicate with the host 200 at one time, and each channel may independently operate.

The memory units of the same kind may be coupled to one channel and interconnected to one another through the relay unit 129 so that each memory unit may serve as a memory.

For example, as can be seen from FIG. 2, the memory device 100 may include four channels ch1, ch2, ch3, and ch4. The first channel ch1-1 and ch1-2 may include a first master memory unit 111 and a first slave memory unit 121. The first master memory unit 111 may communicate with the host 200 through the interface 300. If the first master memory unit 111 has run out of data storage space, the first slave memory unit 121 may provide an additional data storage space. If storage capacity is insufficient despite the first slave memory unit 121, one or more additional slave memory units may be installed in the memory device 100 as necessary.

Even if one or more additional slave memory units are installed in the memory device 100 as shown in FIG. 1, the memory device 100 is installed in one slot 400, and thus an additional space for the additional memory units is not required. Therefore, the semiconductor device 10' according to an embodiment may secure a data storage space easily and flexibly.

The first master memory unit 111 and the first slave memory unit 121 may have the same memory characteristics.

Likewise, the second master memory unit 113 and the second slave memory unit 123 contained in the second channels ch2-1 and ch2-2, the third master memory unit 115 and the third slave memory unit 125 contained in the third channels ch3-1 and ch3-2, and the fourth master memory unit 115 and the fourth slave memory unit 125 contained in the fourth channels ch4-1 and ch4-2 may have the same memory characteristics as one another, respectively.

Accordingly, the host 200 may store memory characteristic information regarding memory characteristics (e.g., the position, type, and capacity of each memory) of each memory unit per channel in the storage unit 210, and then manage the memory characteristics stored in the storage unit 210.

The interface 300 may confirm connection states of the memory units 111, 113, 115, 117, 121, 123, 125, and 127 contained in the memory device 100, and allow the host 200 to interface with the memory device 100.

Figure 3:
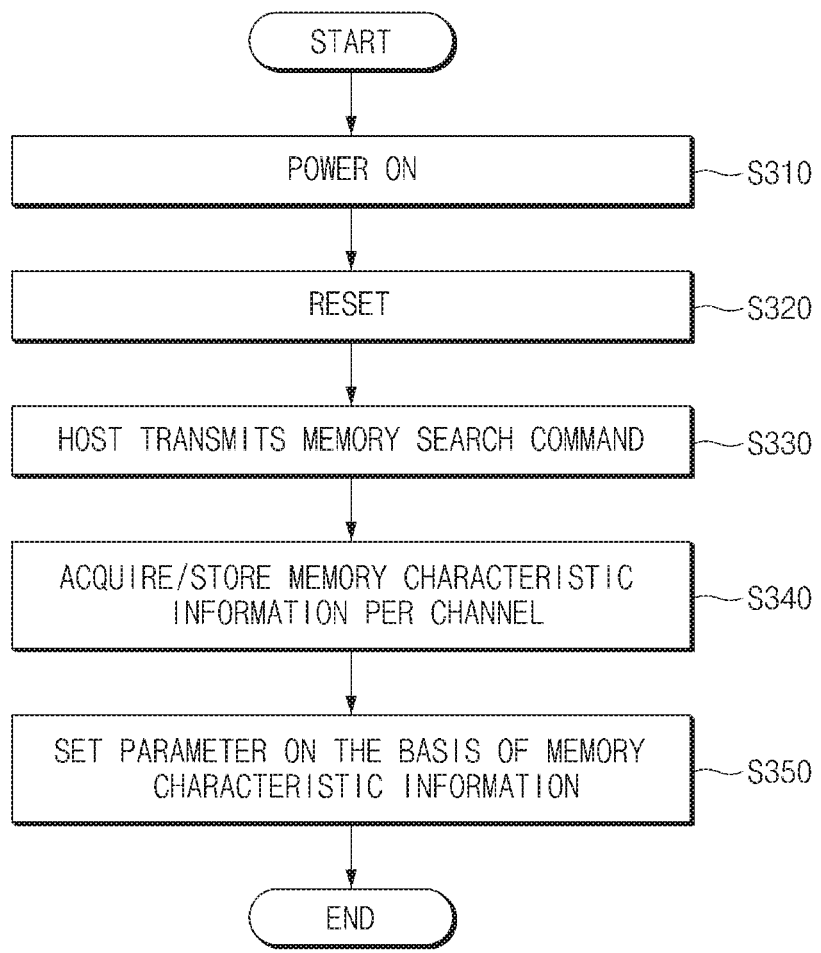
FIG. 3 is a flowchart illustrating example operations of the semiconductor device according to an embodiment of the present disclosure.

FIG. 3 is a flowchart illustrating operations of the semiconductor device according to an embodiment of the present disclosure. Referring to FIGS. 1-3, setting operations of the semiconductor devices 10 and 10' are described.

As described above, various types of memory units may be contained in the semiconductor devices 10 and 10' according to an embodiment, and types of memory units contained in one memory device 100 may vary. Therefore, the setting operation for indicating the type and characteristics of each memory unit of a specific channel may be needed.

The operations of the semiconductor devices 10 and 10' according to embodiments may include a plurality of steps S310 to S350.

If the semiconductor device 10 and 10' is powered on in the step S310, the semiconductor device 10 and 10' may be reset in the step S320. The reason why the semiconductor device 10 and 10' is reset is that the types and positions of memory units contained in the memory unit 100 may be changed. However, in an embodiment, the semiconductor device 10 and 10' may perform the operations following the power-on process without resetting.

In the step S330, the host 200 contained in the semiconductor device 10 and 10' may transmit a memory search command for figuring out what type of memory unit is contained in the memory device 100. As described above, the memory search command may be executed after resetting whenever the semiconductor device 10 and 10' is powered on, or may be executed at a predetermined time interval.

In response to the memory search command of the host 200, memory characteristic information of various memory units 111, 113, 115, 117, 121, 123, 125, and 127 contained in the memory device 100 may be acquired. In the step S340, the acquired memory characteristic information is applied to the host 200 so that the resultant memory characteristic information may be stored in the storage unit 210 of the host 200.

In accordance with an embodiment, memory characteristic information of the memory device 100 may be acquired and stored per channel. The memory characteristic information of the memory device 100 may include information as to the position, type, and capacity of each memory unit.

In the step S350, the host 200 may set the parameters appropriate for memory units coupled to individual channels on the basis of the memory characteristic information. For example, the host 200 may adjust an AC parameter. The adjusted AC parameter may also be stored in the storage unit 210.

After the completion of the setting operation shown in FIG. 3, the host 200 may communicate with the memory device 100 so as to perform read and write operations. In this case, because the host 200 may store the information as to memory characteristics of the memory unit located at a specific channel of the memory device 100 in the storage unit 210, the host 200 may transmit the command, address, and data to perform the read and write operations in a way that is appropriate for the memory unit.

The host 200 may transmit memory type information of the memory unit located at a specific channel and the command, address, and data to the interface 300. The command, address, and data received from the host 200 may be signals obtained by adjusting the AC parameter according to the memory characteristic information.

The interface 300 may convert the command, address, and data received from the host 200 into signals appropriate for the interface used by the memory unit based on the memory type information from the host 200. For example, the interface 300 may perform encoding, decoding, or address remapping of the command, address, and data.

In contrast, if the host 200 receives data from the memory device 100, the host 200 may recognize which channel is associated with data received from the memory device 100 and interpret the data using the scheme appropriate for the recognized channel. In accordance with an embodiment, the signal transmitted from the memory device 100 to the host 200 may include memory type information. Therefore, the host 200 may interpret the signal on the basis of the memory type information.

As described above, the semiconductor device according to an embodiment allows the host 200 to adjust the AC parameter on the basis of memory characteristic information in association with the memory device 100 including various kinds of memory units, and includes the unified interface 300 such that the semiconductor device can interface with various memory units through the unified interface 300.

In addition, various memory units installed in one slot and extended through a relay unit can achieve a high integration density.

As is apparent from the above description, the semiconductor device according to embodiments includes an interface capable of driving various kinds of memories to operate even when other memories having different characteristics are installed.

The semiconductor device according to embodiments can have various kinds of memories installed in a single slot, and thus achieve a high integration density.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an embodiment of the present disclosure or included as a new claim by a subsequent amendment after the application is filed.

Although a number of illustrative embodiments consistent with the invention have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A semiconductor device comprising:
   a memory device including various types of memory units configured to be installed in one slot;
   a host configured to store memory characteristic information of the various types of memory units contained in the memory device, process a signal for the memory units on the basis of the memory characteristic information, and transmit and receive the processed signal to and from the memory units; and
   an interface configured to allow the host to interface with the various types of memory units contained in the memory device,
   wherein the host generates the memory characteristic information for each channel among a plurality of channels, generates an AC parameter on the basis of the memory characteristic information, and stores the AC parameter.

2. The semiconductor device according to claim 1, wherein the memory device includes:
   a master memory unit block configured to communicate with the host through the interface and include various types of master memory units; and
   at least one slave memory unit block coupled to the master memory unit through a relay unit and configured to include various types of slave memory units.

3. The semiconductor device according to claim 2, wherein the same type of memory units among the various types of master memory units and the various types of slave memory units are interconnected through the relay unit within one channel among the plurality of channels.

4. The semiconductor device according to claim 3, wherein the information communicated between the memory device and the host includes memory type information of the memory units.

5. The semiconductor device according to claim 4, wherein the interface operates on the basis of the memory type information.

6. The semiconductor device according to claim 3, wherein the host transmits a memory search command to the memory device at a predetermined time interval, and acquires memory characteristic information of the memory units contained in the channel.

7. The semiconductor device according to claim 2, wherein the various types of memory units include at least one of a Dynamic Random Access Memory (DRAM), a flash memory, a Spin-Torque Transfer Magnetic RAM (STT-MRAM), a Phase Change RAM (PCRAM), and a resistive RAM (Re RAM).

8. The semiconductor device according to claim 1, wherein the host is configured to process data, command, and address for the memory units on the basis of the AC parameter, and provide the processed data, command, and address to the memory units.

9. The semiconductor device according to claim 1, wherein the interface includes a physical layer.

* * * * *